July 24, 1951 W. H. BOHNENBLUST 2,561,778
AIR-CURRENT DEFLECTOR
Filed June 7, 1948
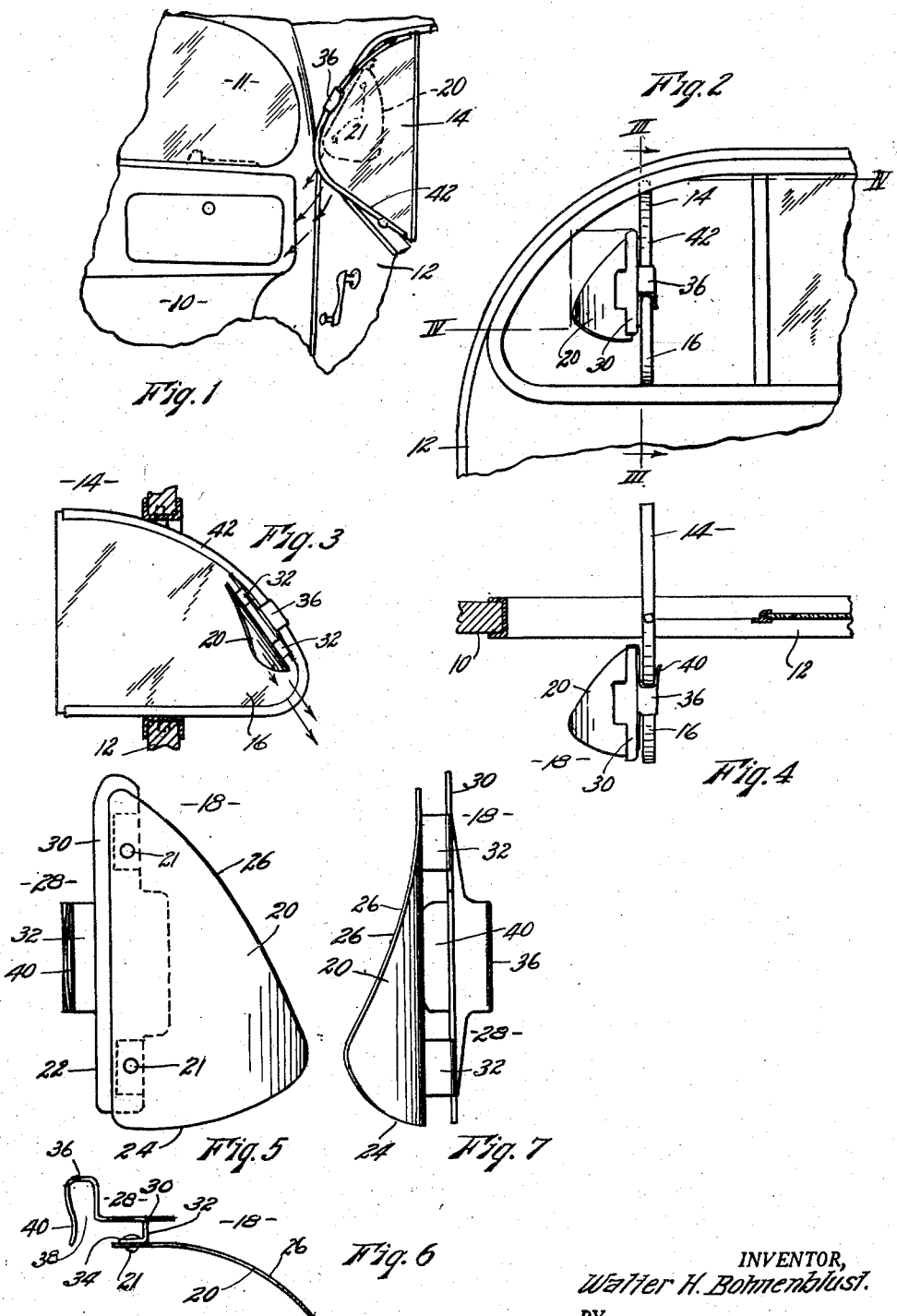
INVENTOR,
Walter H. Bohnenblust.
BY
Roy E. Hamilton,
Attorney.

Patented July 24, 1951

2,561,778

UNITED STATES PATENT OFFICE 2,561,778

AIR-CURRENT DEFLECTOR

Walter H. Bohnenblust, Kansas City, Mo.

Application June 7, 1948, Serial No. 31,511

5 Claims. (Cl. 296—44)

This invention relates to improvements in air current deflectors carried by the pivotally mounted vent sash of an automobile whereby the incoming air into the body of the automobile is controlled.

The standard vent sash air deflector now being used has the objectional feature of directing the incoming air against the head of the driver or others seated in the vehicle, thus presenting the hazard of blowing cigarette ashes into the driver's face.

The principal object of the present invention is the provision of an air current deflector so carried by the vent sash of an automobile that it will direct the incoming air to the automobile body, inwardly and downwardly and away from the heads of the occupants of the car.

Another object of this invention is the provision of an air current deflector so constructed that when properly mounted on the vertically pivoted vehicle ventilator, may be positioned to direct air currents moving along the face of said pivoted ventilator, downwardly and inwardly into said vehicle and also to simultaneously direct a current of air forwardly against the windshield of the vehicle.

Other objects of the invention are simplicity and economy of construction, ease of attachment to the pivoted vent sash and adaptability for use on the various types of vent sashes.

With these objects in view as well as other objects which will appear during the course of the specification, reference will be had to the drawings wherein:

Figure 1 is a fragmentary perspective view of the right front inner corner portion of an automobile showing a pivotally mounted vent sash with an air current deflector attached thereto embodying this invention.

Fig. 2 is an inside elevational view of the vent sash with the air current deflector attached and parts broken away.

Fig. 3 is a sectional view taken on line III—III of Fig. 2.

Fig. 4 is a horizontal sectional view taken on line IV—IV of Fig. 2.

Fig. 5 is an enlarged inner face view of the air current deflector.

Fig. 6 is a plan view of the deflector shown in Fig. 5.

Fig. 7 is the upper edge view of the deflector.

Throughout the several views like reference characters refer to similar parts of the drawing, and the numeral 10 designates an automobile body structure having a windshield 11 and a front door 12 provided with a ventilating aperture 14 having a vertically pivoted vehicle ventilator or sash 16.

The present invention relates to an air current deflector 18 having a substantially arcuate wing portion 20 having straight front edge 22 and a curved lower edge 24 and a curved side edge 26 to present a substantially triangular deflector. Referring to Fig. 6 of the drawings it will be noted that the portion of wing 20 adjacent straight edge 22 is of planar form. A bracket 28 having a body 30 and provided with transversely disposed legs 32 having feet 34 by means of which the body 30 is positioned and secured to the wing 20 in spaced apart parallel relation thereto by rivets 21 whereby to provide for the passage of air between said bracket body and deflector. The outer edge of body 30 extends outwardly beyond the edge 22 of the deflector and is provided with a U-shaped clamping member 36 having an open side 38 disposed to receive a planar member 16 therein at right angles to said planar body portion 30.

The free edge of wall 40 of said clamping member 36 is inwardly arched to permit easy access of the air current deflector to position on the planar ventilator member 16.

This vertically pivoted vehicle ventilator or sash member 16 is provided with a suitable edge binding member 42 over which clamping member 36 must be fitted. The clamp member 36 is made of resilient material to snap into position to clampingly engage the ventilator member 16, and due to its arcuate form will pass over the binder 42 without distorting or marring it.

Referring to the drawings, it will be noted that the deflector is so positioned on the sash that when it is turned inwardly into the automobile (see Fig. 3), it will deflect the air that moves along the sash downwardly into the car, thus preventing to a large degree, the direct blast of air against the occupants' faces.

This movement of cool air inwardly and downwardly into the car will cause the hot air to move upwardly and outwardly from the car above the ventilating wing 18, furthermore, due to the positioning of the body 30 of the bracket 28 in parallel spaced apart relation to wing 20 and the fact that it extends forwardly of the wing, air will be forced therebetween and be directed against the end portion of the windshield 11 to keep the windshield clear.

While I have shown an air current deflector for the right front side of the car it is quite apparent that with slight changes, a deflector could be made for the left side also.

What I claim as new and desire to cover by Letters Patent is:

1. An air current deflector of the character described for use on a vertically pivoted vehicle ventilator, comprising a curved wing having a substantially planar edge portion, a bracket having a substantially planar body portion and transversely extending legs secured in spaced apart parallel relation to the planar portion of said wing whereby to provide an air passageway between said bracket body and said wing, and a U-shaped clamping means formed integral with said bracket to engage the edge portion of said vehicle ventilator and to support the planar portion of said wing at a substantially right angle to said vehicle ventilator.

2. An air current deflector of the character described for use on a vertically pivoted vehicle ventilator, comprising a curved wing having a substantially planar edge portion, a bracket having a substantially planar body portion and transversely extending legs secured in spaced apart parallel relation to the planar portion of said wing whereby to provide an air passageway between said bracket body and said wing, and positioned to extend outwardly therebeyond, and a U-shaped clamping means formed integral with said bracket and extending outwardly beyond the body portion of said bracket to engage the edge portion of said vehicle ventilator and to support the planar portion of said wing at a substantially right angle to said vehicle ventilator.

3. An air current deflector of the character described for use on a vertically pivoted vehicle ventilator, comprising a curved wing having a substantially planar straight edge portion, a bracket having a substantially planar elongated body portion and transversely extending legs secured in spaced apart parallel relation to the planar portion of said wing and positioned to extend outwardly therebeyond whereby to provide an air passageway between said bracket body and said wing, and a U-shaped clamping means formed integral with said bracket and extending outwardly beyond the body portion of said bracket to engage the edge portion of said vehicle ventilator and to support the planar portion of said wing in spaced apart relation thereto at a substantially right angle to said vehicle ventilator, whereby air passing along said vehicle ventilator will be directed forwardly between said wing and said bracket.

4. An air current deflector of the character described for use on a vertically pivoted vehicle ventilator comprising a cylindrically curved wing having a planar edge portion, a bracket having spaced apart, transversely extending legs secured to the convex side of and adjacent the planar edge portion of said curved wing whereby the body of said bracket is disposed in parallel spaced apart relation to said planar edge portion whereby to form an air passageway between said bracket body and said wing, and a relatively narrow U-shaped clamping means formed integral with said bracket to receive the edge portion of said vehicle ventilator therebetween to support the planar edge portion of said wing at a substantially right angle thereto.

5. An air current deflector of the character described for use on a vertically pivoted vehicle ventilator comprising a cylindrically curved wing of substantially triangular form and having a planar edge portion, a bracket having spaced apart, transversely extending legs secured to the convex side of and adjacent the planar edge portion of said curved wing whereby the body of said bracket is disposed in parallel spaced apart relation to said planar edge portion whereby to form an air passageway between said bracket body and said wing, and a relatively narrow U-shaped clamping means formed integral with said bracket to receive the edge portion of said vehicle ventilator therebetween to support the planar edge portion of said wing at a substantially right angle thereto.

WALTER H. BOHNENBLUST.

REFERENCES CITED

The following references are of record in the file of this patent:

UNITED STATES PATENTS

| Number | Name | Date |
| --- | --- | --- |
| 2,019,105 | Van Voorhees | Oct. 29, 1935 |
| 2,147,855 | Normandin | Feb. 21, 1939 |
| 2,224,433 | Holden | Dec. 10, 1940 |